United States Patent
Ohba et al.

(10) Patent No.: US 10,055,815 B2
(45) Date of Patent: Aug. 21, 2018

(54) IMAGE PROCESSING APPARATUS, IMAGE PROCESSING SYSTEM, IMAGING APPARATUS AND IMAGE PROCESSING METHOD

(71) Applicant: SONY INTERACTIVE ENTERTAINMENT INC., Tokyo (JP)

(72) Inventors: Akio Ohba, Kanagawa (JP); Hidehiko Ogasawara, Tokyo (JP); Hiroyuki Segawa, Kanagawa (JP); Tetsugo Inada, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/312,210

(22) PCT Filed: May 28, 2015

(86) PCT No.: PCT/JP2015/065448
§ 371 (c)(1),
(2) Date: Nov. 18, 2016

(87) PCT Pub. No.: WO2015/186605
PCT Pub. Date: Dec. 10, 2015

(65) Prior Publication Data
US 2017/0109864 A1 Apr. 20, 2017

(30) Foreign Application Priority Data
Jun. 4, 2014 (JP) ................................. 2014-115870

(51) Int. Cl.
*G06K 9/00* (2006.01)
*G06T 3/40* (2006.01)
*G06T 5/00* (2006.01)

(52) U.S. Cl.
CPC ............ *G06T 3/4015* (2013.01); *G06T 5/002* (2013.01)

(58) Field of Classification Search
CPC ......... G06T 2207/10024; G06T 3/4015; G06T 3/403; G06T 5/002; H04N 5/357; H04N 2209/046
See application file for complete search history.

(56) References Cited

U.S. PATENT DOCUMENTS

| 8,363,123 | B2 * | 1/2013 | Inaba | G06T 3/4015 348/222.1 |
| 8,452,092 | B2 * | 5/2013 | Sasaki | G06T 3/4015 382/162 |

(Continued)

FOREIGN PATENT DOCUMENTS

| EP | 0999518 A1 | 5/2000 |
| JP | 07-236147 | 9/1995 |

(Continued)

OTHER PUBLICATIONS

International Search Report and Written Opinion dated Aug. 4, 2015, from the corresponding PCT/JP2015/065448.

(Continued)

*Primary Examiner* — Ali Bayat
(74) *Attorney, Agent, or Firm* — Katten Muchin Rosenman LLP

(57) ABSTRACT

An imaging apparatus 12 acquires RAW images 202a and 202b by left and right cameras and performs a demosaicing process for and stepwise reduction of the RAW images 202a and 202b to generate and correct colored image groups 204a and 204b which represent picked up images with a plurality of resolutions (S10 and S12). Image process parameters 206 acquired in the course of the demosaicing process and the correction process are transmitted to a host terminal 20 together with part of colored images and data of a partial (Continued)

image 208 of the RAW image 202a. The host terminal 20 utilizes the image process parameters 206 transmitted from the imaging apparatus 12 to perform a demosaicing process for the partial image 208 to generate and correct a colored image 212 (S16). The host terminal 20 utilizes the colored image transmitted from the imaging apparatus 12 and the colored image 212 generated therein to generate an image 214 to be displayed (S18 and S20).

3 Claims, 5 Drawing Sheets

(56) References Cited

U.S. PATENT DOCUMENTS

| | | | |
|---|---|---|---|
| 9,363,493 B2* | 6/2016 | Tanaka | H04N 9/045 |
| 9,407,884 B2* | 8/2016 | Sugawara | H04N 5/3696 |
| 2009/0052797 A1 | 2/2009 | Matsushita et al. | |
| 2010/0195929 A1 | 8/2010 | Inoue | |
| 2012/0218438 A1 | 8/2012 | Ohba et al. | |

FOREIGN PATENT DOCUMENTS

| | | |
|---|---|---|
| JP | 2008-153836 A | 7/2008 |
| JP | 2008-177724 A | 7/2008 |
| JP | 2011-97521 A | 5/2011 |
| WO | 2007/050885 A2 | 5/2007 |
| WO | 2008/075745 A1 | 6/2008 |

OTHER PUBLICATIONS

International Preliminary Report on Patentability dated Oct. 6, 2016, from the corresponding PCT/JP2015/065448.

* cited by examiner

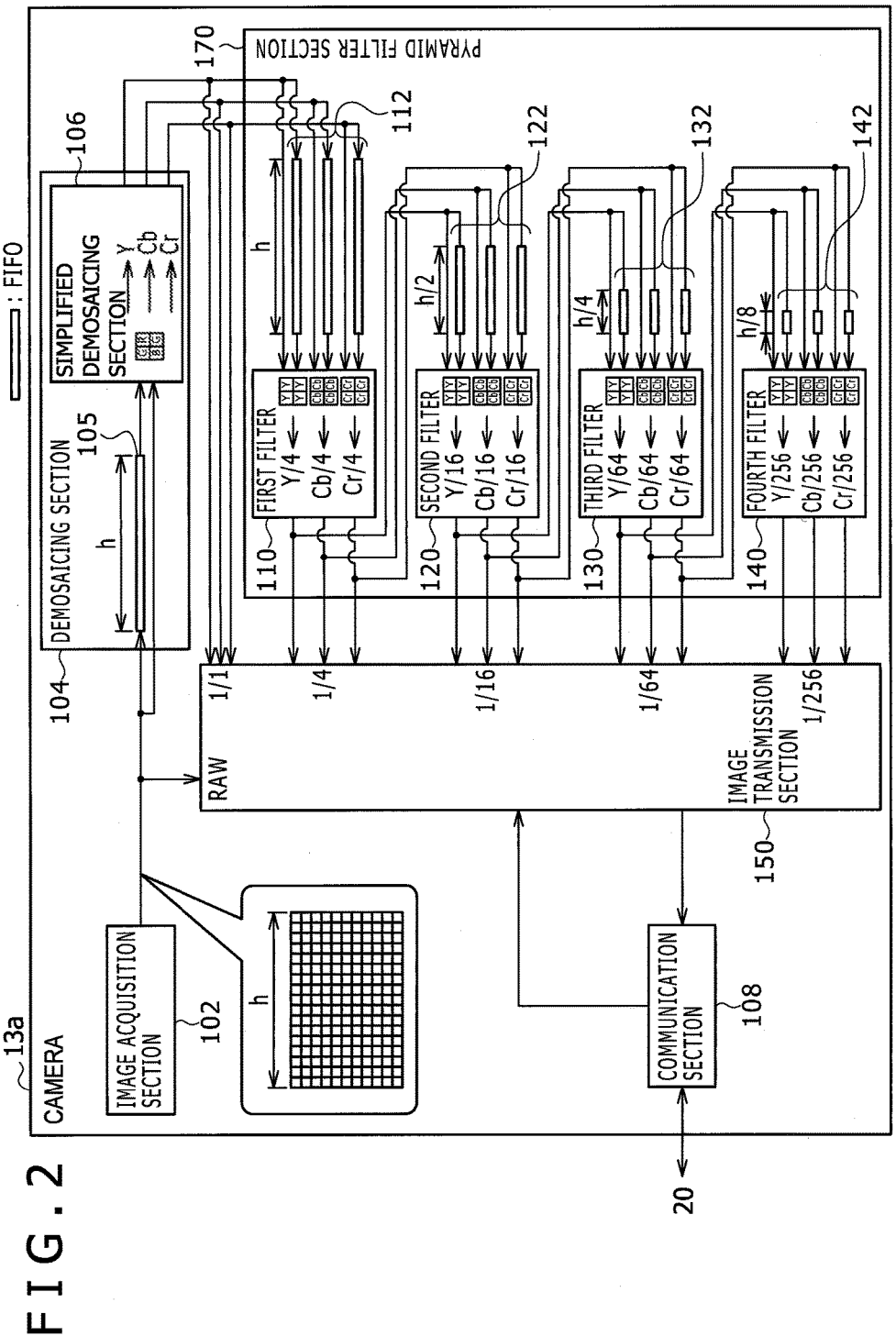
F I G . 2

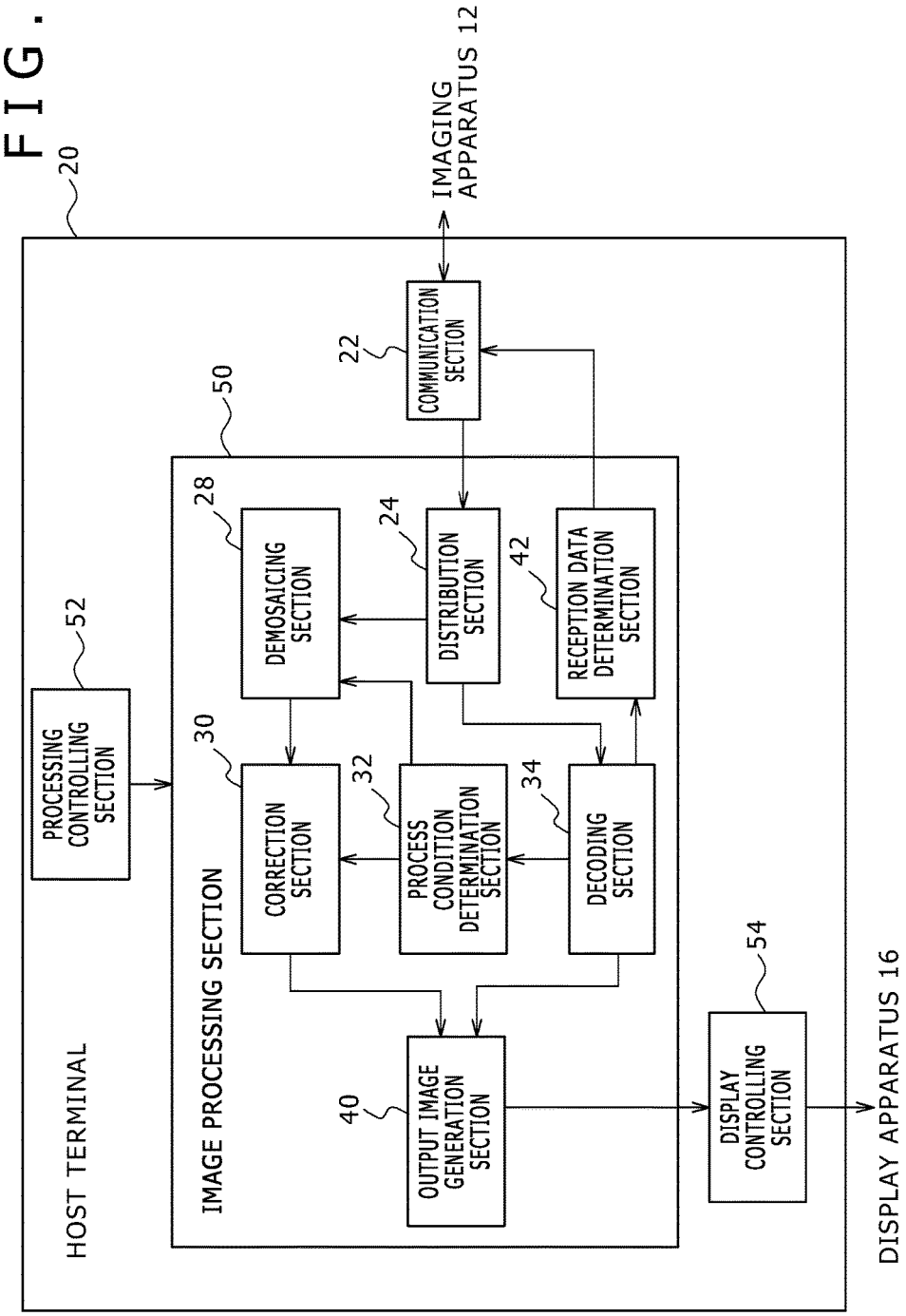

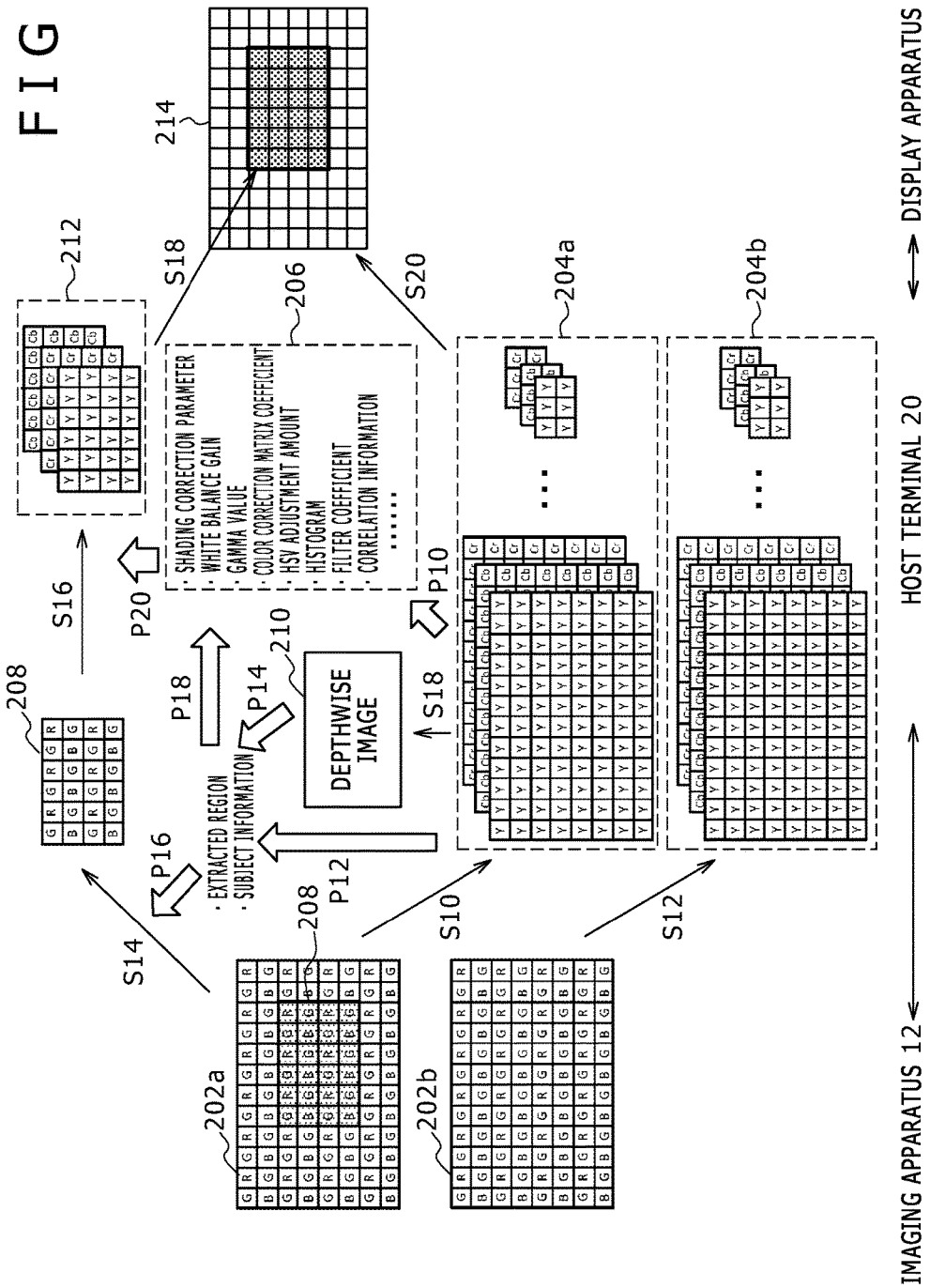

IMAGE PROCESSING APPARATUS, IMAGE PROCESSING SYSTEM, IMAGING APPARATUS AND IMAGE PROCESSING METHOD

TECHNICAL FIELD

The present invention relates to an image processing apparatus, an image processing system, an imaging apparatus and an image processing method by which an image processing is performed using a picked up image picked up by a camera.

BACKGROUND ART

In recent years, it has become common to incorporate a camera into a personal computer, a game machine or the like to pick up an image of an appearance of a user and utilize the image in various forms. Apparatuses which transmit an image of a user as it is to an opponent through a network such as, for example, visual telephones or video chat, apparatuses which recognize a movement of a user by image analysis so as to utilize the movement as input information for a game or information processing and like apparatuses have been put into practical use (refer, for example, to PTL 1).

In the technologies, generally a demosaicing (de-mosaic) process for completing a so-called RAW image obtained directly from an imaging device with color information of each pixel is performed in the camera. Data of a full-color image generated in this manner is suitably compression coded by a compression method of JPEG (Joint Photographic Experts Group) or the like and is transferred to an information processing apparatus or the like.

CITATION LIST

Patent Literature

[PTL 1]
WO 2007/050885 A2

SUMMARY

Technical Problem

In such general technologies as described above, it is considered that original information obtained upon imaging is partly lost by a process in a camera and this may restrict processing in the information processing apparatus receiving the information or may result in failure in assurance of demanded processing accuracy. On the other hand, if the quality of image data to be transferred from a camera is raised, then the load of processing on the entire system increases or the transfer process is stagnated, resulting in appearance of a delay in information processing. Thus, there is a dilemma that the responsiveness from imaging to outputting of a result is deteriorated.

The present invention has been made in view of such a problem as described above, and it is an object of the present invention to provide a technology capable of achieving both of the responsiveness and the accuracy of image processing in which a picked up image is utilized.

Solution to Problem

A mode of the present invention relates to an image processing apparatus. The image processing apparatus is an image processing apparatus which generates a display image using an image picked up by an imaging apparatus and causes a display apparatus to display the display image, including a reception section configured to receive at least part of each of data of a non-processed image outputted from an imaging device, data of a colored image obtained by performing a demosaicing process and a correction process for the non-processed image and process information acquired in the course of generation of the colored image from the imaging apparatus, a demosaicing section configured to perform a demosaicing process and a correction process for the data of the non-processed image to generate a colored image, and a display image generation section configured to generate a display image using the colored image generated by the demosaicing section and a colored image transmitted from the imaging apparatus, wherein the demosaicing section utilizes the process information transmitted from the imaging apparatus in the course of at least one of the demosaicing process and the correction process.

Another mode of the present invention relates to an image processing system. The image processing system is an image processing system including an imaging apparatus, and an image processing apparatus which uses an image picked up by the imaging apparatus to generate a display image and causes a display apparatus to display the display image, wherein the imaging apparatus includes a first demosaicing section configured to acquire data of a non-processed image outputted from an imaging device and perform a demosaicing process and a correction process for the data of the non-processed image to generate a colored image, and a transmission section configured to transmit data of at least part of each of the non-processed image, the colored image and process information acquired by the first demosaicing section in the course of generation of the colored image to the image processing apparatus, the image processing apparatus includes a reception section configured to receive the data transmitted from the imaging apparatus, a second demosaicing section configured to perform a demosaicing process and a correction process for the data of the transmitted non-processed image to generate a colored image, and a display image generation section configured to generate a display image using the colored image generated by the second demosaicing section and the colored image transmitted from the imaging apparatus, and the second demosaicing section utilizes the process information transmitted from the imaging apparatus in the course of at least one of the demosaicing process and the correction process.

A further mode of the present invention relates to an imaging apparatus. The imaging apparatus is an imaging apparatus which supplies data of a picked up image to an image processing apparatus which generates a display image using a picked up image and causes a display apparatus to display the display image, including a demosaicing section configured to acquire data of a non-processed image outputted from an imaging device and perform a demosaicing process and a correction process for the data of the non-processed image to generate a colored image, and a transmission section configured to transmit, to the image processing apparatus, data of at least part of the data of the non-processed image which is determined as a target for which a demosaicing process and a correction process are to be performed in the image processing apparatus, at least part of data of the colored image to be used for generation of the display image and at least part of process information acquired by the demosaicing section in the course of generation of the colored image and utilized in the course of at least one of the demosaicing process and the correction process in the image processing apparatus.

A still further mode of the present invention relates to an image processing method. The image processing method is an image processing method by an image processing apparatus which generates a display image using an image picked up by an imaging apparatus and causes a display apparatus to display the display image, including a step of receiving at least part of each of data of a non-processed image outputted from an imaging device, data of a colored image obtained by performing a demosaicing process and a correction process for the non-processed image and process information acquired in the course of generation of the colored image from the imaging apparatus, a step of performing a demosaicing process and a correction process for the data of the non-processed image to generate a colored image, and a step of generating a display image using the colored image generated by the step of generating and a colored image received by the step of receiving and outputting the display image to the display apparatus, wherein the step of generating utilizes the process information received by the step of receiving in the course of at least one of the demosaicing process and the correction process.

It is to be noted that arbitrary combinations of the components described above and conversions of the representation of the present invention between arbitrary ones of a method, an apparatus, a system, a computer program, a recording medium in which the computer program is recorded and so forth are effective as modes of the present invention.

Advantageous Effect of Invention

According to the present invention, both of the accuracy and the responsiveness can be achieved in image processing in which a picked up image is utilized.

BRIEF DESCRIPTION OF DRAWINGS

FIG. 2 is a view particularly depicting a configuration of one of cameras of an imaging apparatus in the present embodiment.

FIG. 4 is a view depicting a configuration of functional blocks of a host terminal which participate in image processing of the present embodiment.

FIG. 5 is a view schematically illustrating transition of image data and flows of information in the present embodiment.

DESCRIPTION OF EMBODIMENT

Figure 1:
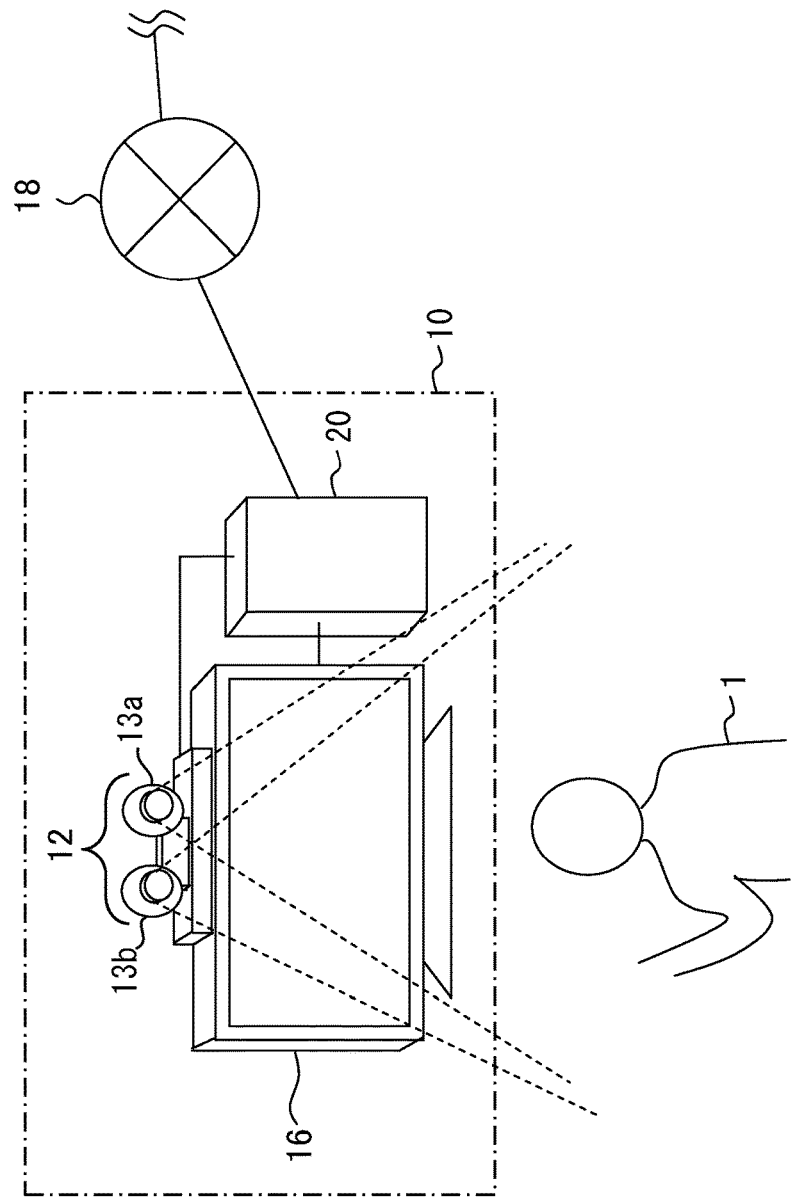
FIG. 1 is a view depicting an example of a configuration of an image processing system to which an embodiment of the present invention can be applied.

FIG. 1 depicts an example of a configuration of an image processing system to which an embodiment of the present invention can be applied. The image processing system 10 includes an imaging apparatus 12 in which two cameras 13a and 13b for imaging a target such as a user 1 are incorporated, a host terminal 20 which performs image processing and information processing in accordance with a request of a user on the basis of a picked up image, and a display apparatus 16 which outputs image data obtained by the processing by the host terminal 20. Further, the host terminal 20 may be configured for connection to a network 18 such as the Internet such that obtained image data are transmitted to a different terminal or a server.

The host terminal 20, imaging apparatus 12, display apparatus 16 and network 18 may be connected to one another by a wire cable or may be connected in a wireless fashion to one another by a wireless LAN (Local Area Network) or the like. Further, two or all of the imaging apparatus 12, host terminal 20 and display apparatus 16 may be combined and provided as a unitary apparatus. Further, the imaging apparatus 12 may not necessarily be installed on the display apparatus 16. Further, the user 1 may not be a person, or the number of such users is not restricted.

The imaging apparatus 12 is configured such that the two cameras 13a and 13b having a two-dimensional array of imaging devices such as CCD (Charge Coupled Device) imaging devices or CMOS (Complementary Metal Oxide Semiconductor) imaging devices are disposed at left and right positions spaced by a known distance from each other. The two cameras 13a and 13b pick up images of a target existing in the same space from the left and right positions at a predetermined frame rate. A pair of image frames picked up in this manner are hereinafter referred to as "stereo image."

The cameras 13a and 13b individually acquire data of a RAW image in which one pixel represents one color in an array of colors such as a Bayer array as an image frame. The cameras 13a and 13b individually perform a demosaicing process of completing the RAW image with color information of the pixels to generate a full-color image (hereinafter referred to as "colored image"). Further, the cameras 13a and 13b individually reduce the colored image to multi stages to generate a plurality of image data of different resolutions. It is to be noted that the cameras 13a and 13b may individually perform image processes such as noise removal, gain correction, gamma correction, outline compensation and color signal correction suitably at a stage of one of steps for such generation of image data.

The host terminal 20 acquires at least part of image data from the imaging apparatus 12 and performs predetermined image processing and information processing using the acquired image data. Although the processing performed by the host terminal 20 is not limited, in the present embodiment, the processing performed particularly by the host terminal 20 includes a demosaicing process for a RAW image acquired from the imaging apparatus 12. In other words, the host terminal 20 by itself performs a demosaicing process separately from the demosaicing process performed by the imaging apparatus 12. Here, by parallelizing the demosaicing processes in accordance with one or both of policies (1) that the host terminal 20 performs a demosaicing process of an image within a range smaller than that of the imaging apparatus 12 and (2) that the host terminal 20 generates a colored image of higher quality than that in the imaging apparatus 12, image generation or information processing of a higher degree of freedom can be performed with high accuracy while increase of the load of image processing or transfer processing is suppressed.

In particular, the size of transfer data can be suppressed by issuing a request only for RAW image data in a restricted region of the face of a person or the like to the imaging apparatus 12 on the basis of an image analysis result of a colored image acquired from the imaging apparatus 12. Further, by making it possible for the host terminal 20 to directly treat a RAW image, a demosaicing process or a correction process by the imaging apparatus 12 can be simplified or the host terminal 20 can compensate for information even if only a colored image of a low resolution is transferred or an irreversible compression process such as a process of JPEG is performed.

By such a configuration as described above, for example, a synthesis image in which part of a display image is an image of high quality generated from a RAW image by the host terminal 20 and an image in the peripheral region thereof is simplified as a colored image transferred from the imaging apparatus 12 can be displayed. Further, it may seem a promising idea to detect a region which includes some movement using colored images transferred from the imaging apparatus 12 and perform image analysis more particularly for different colored images of higher quality generated by the host terminal 20 from the RAW images of the region to recognize a gesture, a facial expression or the like with high accuracy and then proceed with a game on the basis of the recognition or convert the recognition into a command to perform information processing.

In the configuration in which demosaicing processes are performed parallelly by the imaging apparatus 12 and the host terminal 20 in this manner, in the present embodiment, also intermediate data acquired in the course of the demosaicing process or the correction process performed by the imaging apparatus 12 and necessary processing parameters are transmitted to the host terminal 20. Consequently, since some process in the demosaicing process or the correction process in the host terminal 20 can be omitted, the load of processing on the entire system can be reduced. Further, even if the target of the demosaicing process or the correction process by the host terminal 20 is only a limited region, if intermediate data and parameters obtained from the overall region are used, then the accuracy in processing can be maintained irrespective of the size or the position of the region. A particular example is hereinafter described.

Since information processing finally performed by the host terminal 20 or output data generated finally by the host terminal 20 are not restricted particularly in this manner, the following description is given principally with regard to parallelization of demosaicing processes and transmission and reception of various data. It is to be noted that, depending upon a process performed by the host terminal 20, the imaging apparatus 12 may be configured from only one camera. Although the following description is given assuming that the imaging apparatus 12 is configured from a stereo camera, the present embodiment can be applied similarly also where the imaging apparatus 12 is configured from a single camera.

The display apparatus 16 displays a result of processing performed by the host terminal 20 as an image as occasion demands. The display apparatus 16 may be a television set which has a display unit which outputs an image and a speaker which outputs sound, and may be, for example, a liquid crystal television set, a plasma television set or a PC (Personal Computer) display unit. The substance of processing to be executed finally by the host terminal 20 or the image to be displayed is not restricted particularly depending upon an object of use as described hereinabove.

FIG. 2 particularly depicts a configuration of the camera 13a from within the imaging apparatus 12. Also the other camera 13b has a same configuration. While the cameras 13a and 13b are configured, in hardware, from a CPU (Central Processing Unit), a RAM (Random Access Memory), a ROM (Read Only Memory), a rendering circuit and so forth and, in software, from a program which establishes various functions including a data inputting function, a data retaining function, an image processing function and a rendering function, FIG. 2 depicts functional blocks implemented by cooperation of them. Accordingly, the functional blocks can be implemented in various forms from a combination of hardware and software. It is to be noted that, in order to simplify the description, FIG. 2 includes also a schematic view of an image to be processed by the functional blocks.

The camera 13a includes an image acquisition section 102, a demosaicing section 104, an image transmission section 150, a pyramid filter section 170 and a communication section 108. The image acquisition section 102 reads out an image exposed by an imaging device such as a CCD imaging device or a CMOS imaging device at predetermined timings (for example, 60 times/second). In the following description, it is assumed that the image has a width corresponding to h pixels in a horizontal direction. This image is a so-called RAW image. Every time exposure for one row of a RAW image is completed, the image acquisition section 102 transmits the RAW image for one row to the demosaicing section 104 and the image transmission section 150.

The demosaicing section 104 has a FIFO (First In First Out) buffer 105 having a capacity for h pixels and a simplified demosaicing section 106. The FIFO buffer 105 receives pixel information of one row of a RAW image inputted thereto and retains the pixel information until a pixel of a next row of the RAW image is inputted to the demosaicing section 104. When pixels for two rows are received, the simplified demosaicing section 106 uses the received pixels to execute a demosaicing process of completing the pixels with color information on the basis of surrounding pixels to create a colored image.

As well-known to those skilled in the art, a large number of techniques are available for the demosaicing process. FIG. 2 supposes, from among the large number of techniques, a simplified demosaicing process which utilizes pixels only of two rows. In this case, where a pixel from which corresponding color information is to be calculated has only a G value, RGB (Red, Green and Blue) values are determined such that an R value of the pixel is given by an average value of R values of adjacent left and right pixels; a G value is given by the G value of the pixel itself; and a B value is given as a B value of a pixel positioned above or below the pixel. Then, the RGB values are substituted into a predetermined conversion formula to calculate YCbCr values.

As a modification to the simplified demosaicing process, a technique of configuring YCbCr values of one pixel from four pixels of RGB may be used. In this case, since a colored image of a size equal to ¼ that of the RAW image is obtained, a first filter 110 hereinafter described can be eliminated. The simplified demosaicing section 106 converts four pixels of RGB, namely, two down and two across, into a YCbCr color signal, for example, as illustrated in the drawing. Then, the block configured from the four pixels is passed as a 1/1 colored image to the image transmission section 150 and is transmitted to the pyramid filter section 170.

The reason why such a simplified demosaicing process may be performed by the imaging apparatus 12 is that necessary information can be obtained by compensation by a demosaicing process and so forth of a RAW image by the host terminal 20 as described hereinabove. On the other hand, it is not intended to restrict the demosaicing process by the imaging apparatus 12 in this manner, and further, the configuration of the FIFO buffer 105 and so forth may be changed suitably in response to a technique to be used. Also the color space for a RAW image or a demosaiced image may be selected suitably from among various color spaces used in existing technologies.

The pyramid filter section 170 has a function to hierarchically organize a certain image into a plurality of resolutions and output the resultant image. The pyramid filter generally has as many ¼ downsizing filters as appropriate for the required level of resolution. In the present embodiment, the pyramid filter has four hierarchy levels of filters, namely, first to fourth filters 110 to 140. Each of the filters bilinearly interpolates the four pixels adjacent to each other, thus calculating a mean pixel value of the four pixels. Therefore, the processed image size is a quarter of the original size.

An h-pixel-wide FIFO buffer 112 is arranged for each of the Y, CB and Cr signals at the previous stage of the first filter 110. The FIFO buffers 112 retain a row of YCbCr pixels until a next row of pixels is outputted from the simplified demosaicing section 106. The amount of time during which the pixels are retained is determined by the line scan rate of the imaging device.

When supplied with two rows of pixels, the first filter 110 averages the Y, Cb and Cr pixel values of the four pixels, two down and two across. As this process is repeated, the 1/1 colored image is reduced to half in height and width and converted to a quarter of the original size as a whole. The converted quarter-sized colored image is not only sent to the image transmission section 150 but also delivered to the second filter 120 at the next stage.

A 2/h-pixel-wide FIFO buffer 122 is arranged for each of the Y, Cb and Cr signals at the previous stage of the second filter 120. These FIFO buffers 114 retain a row of YCbCr pixels until a next row of pixels is outputted from the first filter 110.

When supplied with two rows of pixels, the second filter 120 averages the Y, Cb and Cr pixel values of the four pixels, two down and two across. As this process is repeated, the quarter-sized colored image is reduced to half in height and width and converted to a ¹⁄₁₆ of the original size as a whole. The converted ¹⁄₁₆-sized colored image is not only sent to the image transmission section 150 but also delivered to the third filter 130 at the next stage.

Each of the third and fourth filters 130 and 140 repeats the same process as described above except that an h/4-pixel wide FIFO buffer 132 or an h/8-pixel wide FIFO buffer 142 is arranged at the previous stage thereto. Then, the third and fourth filters 130 and 140 output ¹⁄₆₄- and ¹⁄₂₅₆-sized colored images to the image transmission section 150, respectively. It should be noted that a pyramid filter as described above is well known as indicated by the fact that it is described, for example, in the specification of European Patent Application Publication No. 0999518. Therefore, a further detailed description thereof will be omitted.

As described above, the image transmission section 150 is supplied with images, each reduced to a quarter size of the original image, from each of the filters of the pyramid filter section 170. As is clear from this, the more the filters of the pyramid filter section 170 data passes through, the smaller the size of the FIFO buffer required at the previous stage of each filter.

The image transmission section 150 selects, of the Raw image received from the image acquisition section 102, 1/1 colored image received from the demosaicing section 104, and quarter- to ¹⁄₂₅₆-sized colored images received from the pyramid filter section 170, a necessary image according to the instruction received from the host terminal 20 via the communication section 108. Then, the image transmission section 150 generates a packet with these images and transmits the packet to the communication section 108.

The communication section 108 transmits the packet to the host terminal 20 according to a predetermined protocol such as USB (Universal Serial Bus) 1.0/2.0. The communication section 108 may communicate with the host terminal 20 not only in a wired manner but also through wireless LAN communication such as, for example, IEEE (Institute of Electrical and Electronic Engineers) 802.11a/b/g and through infrared communication such as IrDA (Infrared Data Association).

Figure 3:
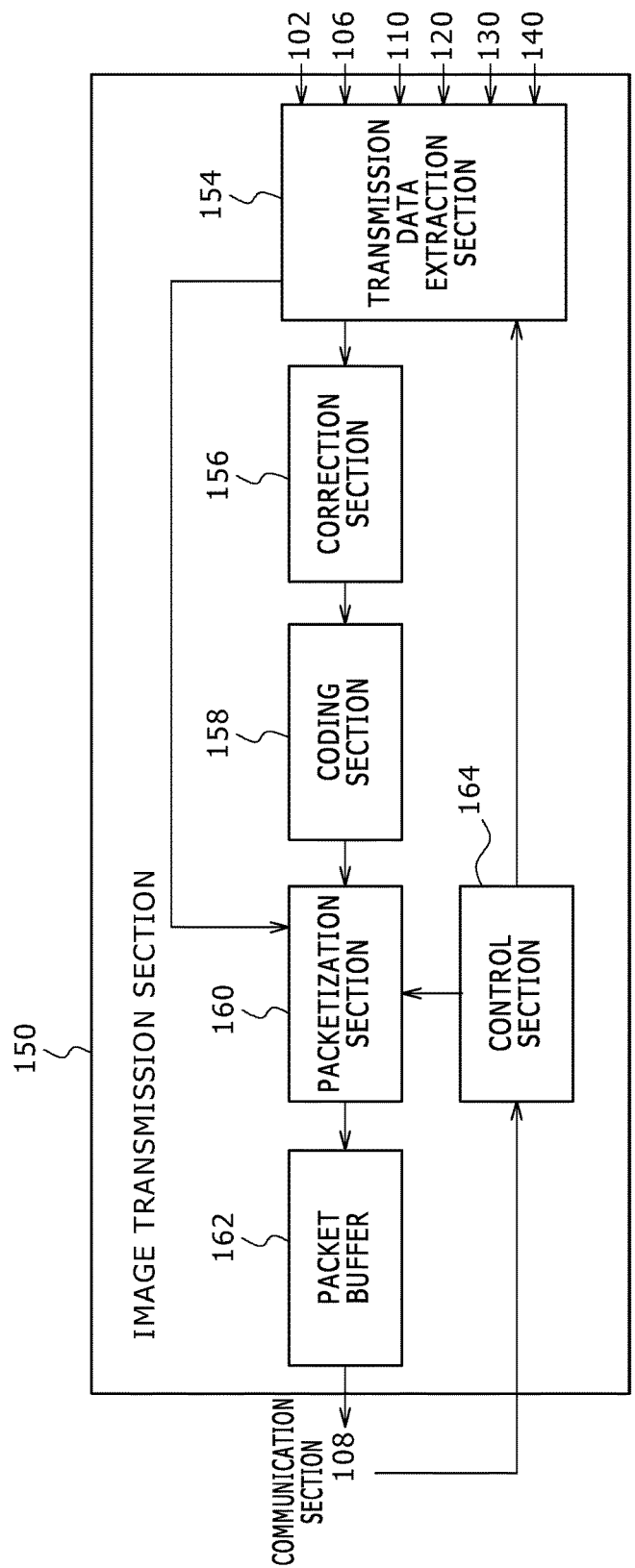
FIG. 3 is a view depicting a configuration of an image transmission section in the present embodiment.

FIG. 3 depicts a configuration of the image transmission section 150. The image transmission section 150 includes a transmission data extraction section 154, a correction section 156, a coding section 158, a packetization section 160, a packet buffer 162 and a control section 164. The control section 164 instructs the transmission data extraction section 154 on the basis of an instruction from the host terminal 20 to transmit image data from among various image data as a packet. In the present embodiment, data in at least some region of a RAW image acquired from the image acquisition section 102 and at least data of a colored image acquired from the demosaicing section 104 or the pyramid filter section 170 are transmitted to the host terminal 20.

To the transmission data extraction section 154, the 1/1 to ¹⁄₂₅₆-sized colored images are inputted through the demosaicing section 104 and the pyramid filter section 170. Further, RAW images are inputted from the image acquisition section 102. Then, the transmission data extraction section 154 extracts data of a colored image of a size designated from the control section 164 and data of the RAW images in a designated region. The size of a colored image and the region of the RAW images to be transmitted are determined in accordance with an object of use of the image and may vary with respect to time depending upon a movement of a subject.

For example, a stereo image of a certain size is transmitted such that the host terminal 20 specifies the position of the subject in a three-dimensional space by stereo matching. Then, if a colored image of a size which varies in proportion to the distance of the subject from the camera and the RAW images in the region of the images of the subject are transmitted further, then a synthesis image particularly representing the subject which is moving can be displayed efficiently on the display apparatus 16 with the transfer data size minimized.

The transmission data extraction section 154 supplies, from within extracted data, data of a colored image and data of a RAW image to the correction section 156 and the packetization section 160, respectively. Since data are inputted for each pixel row from the image acquisition section 102, demosaicing section 104 and pyramid filter section 170 as described hereinabove, the transmission data extraction section 154 successively sends only data to be transmitted to the respective supply destinations.

The correction section 156 performs a well-known correction process such as noise removal, gain correction, shading correction, white balance adjustment, gamma correction, outline compensation and color tone correction for a colored image to be transmitted. Various correction methods to be performed and various algorithms for use for such correction methods have been proposed and put into practical use, and any one of them can be adopted by the present embodiment.

For example, as white balance adjustment, a technique is known of calculating gain values to be used for multiplication of the individual colors such that an average value of the color difference signals Cb and Cr over an overall image may be equal to a set reference value. Alternatively, another method may be used of specifying a light source type of a space of a subject by a predetermined image analysis and acquiring a gain value set for each color in response to the light source type. Alternatively, a user may adjust a gain value for a colored image displayed in an electronic finder (not depicted) provided in the imaging apparatus 12.

The outline compensation process is a process of extracting a location at which a great luminance variation is exhibited using a Laplacian filer or the like as an outline (edge) and arithmetically operating the outline with the original image to emphasize the outline, and the degree of the emphasis can be adjusted with a filter coefficient. The color tone correction process corrects the color tone by arithmetically operating a color difference signal and a color correction matrix coefficient. Here, the matrix coefficient is adjusted such that the difference when a reference image prepared in advance and a picked up image are compared with each other by a color histogram or a luminance histogram is reduced. Also such coefficients may be adjusted by a user with regard to a colored image displayed on the electronic finder.

The shading correction is a process for correcting attenuation of a peripheral light amount depending upon a characteristic of the camera. To this end, usually data obtained by approximating a luminance variation with respect to the distance from a center axis of the camera obtained by picking up white reference data to a quadratic curve or a fourth-order curve are acquired in advance. Then, a correction gain coefficient based on the approximate curve is calculated in response to the distance from the center axis to perform arithmetic operation for the picked up image. It is to be noted that noise removal, gain correction, shading correction and white balance adjustment may be performed for a RAW image before it is subjected to the demosaicing process by the demosaicing section 104. Alternatively, there is no necessity to perform all of the correction processes.

In any case, the correction section 156 supplies parameters used in and calculated and adjusted by the correction processes as additional data to a colored image for which the correction process is performed to the coding section 158 such that they may be transmitted to the host terminal 20. For example, where white balance is adjusted, gain values used for multiplication of the colors are used as the additional data. Similarly, a filter coefficient of the Laplacian filter used in outline compensation, a color correction matrix coefficient used in color tone correction, an approximate curve used in shading correction or a correction gain coefficient may be used as the additional data.

Further, intermediate data generated in the course of performance of a correction process such as data of a color histogram or a luminance histogram in an overall area or in a predetermined region of a picked up image, data of an edge image and so forth may be added. It is to be noted that the "predetermined region" in which a histogram is calculated is a region in which an image of a target such as, for example, the face of a person is imaged, and a result of a face detection process or the like by the host terminal 20 may be received or a face detection process or the like may be performed in the inside of the imaging apparatus 12. To this end, the imaging apparatus 12 may separately include a function for performing a detection process of a target or a function for specifying the position of a subject in a three-dimensional space by stereo matching using a stereo image. The position of a subject in the depthwise direction can be utilized also for determining a size of a colored image to be transmitted as described above.

The coding section 158 compression codes a colored image, for which a correction process is performed by the correction section 156, in accordance with a well-known method such as JPEG and supplies resulting compression codes to the packetization section 160 together with additional data. It is to be noted that a different well-known coding method such as LLVC (Low Latency Video Codec) or AVC (Advanced Video Coding) may be used. The packetization section 160 packetizes data of a RAW image supplied from the transmission data extraction section 154 and data of a colored image after compression coding and additional data supplied from the coding section 158 in an arriving order of the data arrived at the packetization section 160 and writes the packets into the packet buffer 162. The communication section 108 transfers the packets in the packet buffer 162 to the host terminal 20 in accordance with a predetermined communication protocol.

FIG. 4 depicts a configuration of functional blocks of the host terminal 20 which participate in image processing of the present embodiment. Also the components can be implemented, in hardware, from such components as a CPU, a RAM, a ROM, a GPU (Graphics Processing Unit) and an input/output controlling apparatus and, in software, from a program which is loaded into a memory from a recording medium or the like and provides various functions such as a data inputting function, a data retaining function, an image processing function and a rendering function. In FIG. 4, functional blocks implemented by cooperation of them are depicted. Accordingly, the functional blocks can be implemented by various forms from a combination of hardware and software.

The host terminal 20 includes a communication section 22, a processing controlling section 52, an image processing section 50 and a display controlling section 54. The processing controlling section 52 activates an operating system to control general operation of the image processing section 50 and performs other control necessary for the host terminal 20, for example, execution of various applications such as a game or a chat, control of a driver, reading out of a program from a recording medium and so forth. The communication section 22 transmits a transmission request for image data designated by the image processing section 50 to the imaging apparatus 12 and receives and supplies the requested image data from the imaging apparatus 12 to the image processing section 50.

The image processing section 50 includes a distribution section 24, a demosaicing section 28, a correction section 30, a process condition determination section 32, a decoding section 34, an output image generation section 40, and a reception data determination section 42. To the distribution section 24, data of RAW images, coded data of a colored image and additional data transmitted from the imaging apparatus 12 are inputted. The distribution section 24 transmits the data of the RAW images to the demosaicing section 28 and supplies the data of the colored image and the additional data to the decoding section 34 in accordance with the instruction from the processing controlling section 52.

The decoding section 34 decodes coded data of a colored image, which are formed by separating the additional data from among data supplied from the distribution section 24, in accordance with the coding format. The decoding section 34 supplies the separated additional data to the process condition determination section 32. In some cases, also the decoded data of the colored image may be supplied to the process condition determination section 32.

The demosaicing section 28 executes a demosaicing process of RAW images. As the demosaicing process here, a demosaicing process of a high quality type utilizing a calculation resource of the host terminal 20 is applied. For example, an arbitrary algorithm which is available at present or may be developed in the future can be used which uses RGB values of equal to or more than 3×3 pixels to calculate a YCbCr image signal of one pixel or modifies interpolation coefficients taking the degree of correlation between pixels in the horizontal direction and/or the vertical direction into consideration. Such a demosaicing process is disclosed, for example, in Japanese Patent Laid-Open No. 1995-236147.

The correction section 30 performs a well-known correction process for a colored image generated from RAW images by the demosaicing section 28. The correction process performed here may be same as or different from a correction process performed for an image obtained by a demosaicing process in the inside of the imaging apparatus 12. For example, the correction process performed by the correction section 30 in the host terminal 20 may be made a process of a higher level and a higher degree of accuracy. Alternatively, the number of types of correction processes to be performed may be increased.

The process condition determination section 32 uses additional data transmitted as additional data of a colored image from the imaging apparatus 12 to determine various parameters to be used for a demosaicing process to be performed by the demosaicing section 28 or a correction process to be performed by the correction section 30. Alternatively, the process condition determination section 32 may acquire a colored image from the decoding section 34 and analyze the colored image to determine various parameters. Some parameter may be determined from additional data transmitted from the imaging apparatus 12, and some other parameter may be determined by analyzing the colored image.

For example, when the correction section 30 is to adjust the white balance, the process condition determination section 32 supplies a gain value of the white balance transmitted as additional data from the imaging apparatus 12 as it is to the correction section 30. Further, when the correction section 30 is to perform outline compensation or color tone correction, the process condition determination section 32 supplies a filter coefficient of a Laplacian filter or a color correction matrix coefficient transmitted from the imaging apparatus 12 as it is to the correction section 30. The correction section 30 uses the parameters supplied thereto to perform white balance adjustment, outline compensation and color tone correction for the colored image supplied from the demosaicing section 28. By this, the correction section 30 can omit part of the steps of the correction process.

Even if a colored image generated by the demosaicing section 28 is a partial region of an overall picked up image, correction can be performed in optimum conditions by using parameters determined taking the balance of the overall picked up image into consideration. Further, even in such a case that a colored image generated by the host terminal 20 is synthesized with an entire image transmitted from the imaging apparatus 12, the color tone of both images is unified, and a natural image which maintains the continuity is obtained.

Also where intermediate data such as a histogram or an edge image are acquired as additional data, the process condition determination section 32 supplies the intermediate data as they are to the correction section 30. The correction section 30 compares a histogram of a reference image retained in the inside thereof and the histogram supplied thereto with each other to determine parameters such as a color correction matrix coefficient by itself. Alternatively, the correction section 30 arithmetically operates an edge image with a colored image supplied from the demosaicing section 28 to compensate for an outline.

Alternatively, the process condition determination section 32 may acquire a histogram or an edge image of an entire picked up image by itself by acquiring, from the decoding section 34, a colored image transmitted from the imaging apparatus 12 and supply the histogram or the edge image to the correction section 30. Also where intermediate data transmitted from the imaging apparatus 12 or intermediate data generated in the inside of the process condition determination section 32 are used to perform correction, by performing the correction on the basis of image information over a greater range, the process condition determination section 32 can maintain the accuracy even by correction of a partial region.

The process condition determination section 32 may further determine a parameter necessary for the demosaicing process in the demosaicing section 28. For example, the process condition determination section 32 performs a target detection process using a colored image acquired from the decoding section 34 and issues a request to the demosaicing section 28 to perform a demosaicing process only for a region of the detected target from within the RAW image. Alternatively, the process condition determination section 32 may perform stereo matching using a colored stereo image acquired from the decoding section 34 to detect an image of the target from within a generated depthwise image as a target region. The depthwise image here is an image in which the distance of a subject from the camera is represented as a pixel value on a picked up image plane. An image of a target can be specified by performing matching of a template image, which represents an apparent size and shape of a target at a known distance with the depthwise image with the template image expanded or contracted on the basis of the distance of a subject represented by a pixel value of the depthwise image.

The target detection process and the generation process of a depthwise image may be performed by the imaging apparatus 12 such that the process condition determination section 32 may merely utilize results of the processes transmitted. Further, the process condition determination section 32 may use an edge image transmitted as additional data from the imaging apparatus 12 or generated using a colored image transmitted thereto to determine the direction of interpolation of a color in the demosaicing process or change over a filter representative of a weight for interpolation. Further, the edge image may be used in combination with a detection result of a target to adjust the color tone restricting a region. Since noise removal or smoothing can be performed on a wide range of the edge image with high accuracy, by utilizing part of an edge image generated in such a manner as described, even if the demosaicing target is a very small partial region, an outline portion can be specified with high accuracy, and hence, an image obtained by the demosaicing has a higher degree of quality.

The reception data determination section 42 receives a colored image decoded by the decoding section 34. Then, the reception data determination section 42 specifies a region of a picked up image which is particularly important in an application such as a region of an image of a predetermined target in accordance with a well-known image analysis technique. This region is a region of an image of the face of a user, for example, in video chat, or is a region of an image of an eye, the mouth, a hand or a foot in UI (User Interface). Information of the specified region is fed back to the imaging apparatus 12 through the communication section 22. In accordance with the information, data of the RAW images in the region are transmitted from the imaging apparatus 12. Consequently, in regard to the RAW images, only data of a limited region can be transmitted to the host terminal 20 to perform a demosaicing process.

Further, the reception data determination section 42 may determine a size of a colored image necessary for processes to be performed by the process condition determination section 32 or for a generation process of an output image by the output image generation section 40 and issue a request to the imaging apparatus 12 through the communication section 22. For example, when a colored image is used to detect a target, since the apparent size of the target increases as the target comes closer to the camera, a colored image of a higher reduction ratio (of a smaller size) is transmitted. Therefore, the load of transfer or the detection process is suppressed with the detection accuracy kept. As the target is located at a position apart from the camera, the image thereof is decreased in size, whereby a request for a colored image of a lower reduction ratio (of a greater size) is issued in order to maintain the detection accuracy.

When a depthwise image is to be generated, a request for stereo images of the same size is issued. The size of a colored image to be requested varies depending not only upon the position of the target described above but also upon the substance of a process, requested accuracy, a frequency characteristic of an image, a distribution of colors and so forth. Therefore, a rule for deriving an optimum size is set in advance in the inside of the reception data determination section 42, and a hierarchy to be requested is determined on the basis of a characteristic of an image frame at a preceding point of time and so forth. The output image generation section 40 generates an image to be displayed on the display apparatus 16. This image may be an image obtained by a demosaicing process performed for the RAW images by the demosaicing section 28 and corrected by the correction section 30 or part of the image, or may be an image obtained by synthesis of a colored image transmitted from the imaging apparatus 12. Alternatively, a motion or a gesture of the user 1 may be recognized by a functional block not detected such that an image is processed in response to a result of the recognition.

The output image generation section 40 writes a generated output image into a frame buffer (not depicted). The display controlling section 54 generates a video signal for displaying image data rendered in the frame buffer on the display apparatus 16. The video signal generated in this manner is transmitted to and successively displayed on the display apparatus 16. By this, an image of high quality generated in response to an application from a picked up image can be displayed with low latency. Data of the display image may be suitably compression coded and transmitted to a different apparatus through the network 18.

FIG. 5 schematically depicts transition of image data and flows of information in the present embodiment. However, it is neither intended to limit information to be used to that depicted in FIG. 5 nor intended to use all of the depicted information. Further, FIG. 5 illustrates transition of image data and flows of information in the overall image processing system 10 in such directionality that the imaging apparatus 12 is positioned at the left end; the display apparatus 16 is positioned at the right end; and the host terminal 20 is positioned intermediately between them. The difference between the imaging apparatus 12 and the host terminal 20 is not specified as entities of the processes. This is intended that it is to be considered that various processes and entities become intermediate processes to be performed and entities of the processes depending upon the processing capacity and the data transfer band of and an image to be finally outputted and so forth of the imaging apparatus 12 and the host terminal 20, and the boundary therebetween can be suitably selected.

First, the left and right cameras 13a and 13b of the imaging apparatus 12 pick up an image of a common subject space to acquire left and right RAW images 202a and 202b, respectively. The images have a Bayer array as described above. In FIG. 5, each square in the RAW images 202a and 202b indicates one pixel, and which one of red, green and blue the information each pixel has is indicated by a character of "R," "G" or "B."

In the cameras 13a and 13b of the imaging apparatus 12, the demosaicing section 104 performs a demosaicing process for the respective RAW image to generate colored images, in FIG. 5, generate a Y image, a Cb image and a Cr image. The pyramid filter section 170 reduces the colored images stepwise to generate colored image groups 204a and 204b which represent the picked up images with a plurality of resolutions (S10 and S12). An image extracted as a transmission target from between the colored image groups 204a and 204b generated in this manner is subjected to a predetermined correction process by the correction section 156. However, all of the images generated at S10 and S12 may be corrected.

Upon the correction process, the correction section 156 acquires or calculates necessary image process parameters 206 (P10). The correction process performed here may be one or a combination of well-known technologies such as noise removal, gain correction, shading correction, white balance adjustment, gamma correction, outline compensation and color tone correction as described hereinabove. In FIG. 5, as the image process parameters 206, "shading correction parameter," "white balance gain," "gamma value," "color correction matrix," "HSV (Hue, Saturation and Value) adjustment amount," "histogram," "filter coefficient" and "continuity information" are exemplified. However, it is not intended that all of the parameters are acquired by the imaging apparatus 12. Further, some other parameters such as image pickup conditions including the distance to a target determined from a depthwise image, a spatial frequency characteristic or a local high-luminance region determined by an image analysis or an aperture value.

Especially, in the present embodiment, since an important region which requires detailed information from within a picked up image is generated from RAW images by the host terminal 20, the processing efficiency in the imaging apparatus 12 can be raised by using simpler and easier processes than the correction processes by the host terminal 20. Accordingly, assuming that important ones from among the depicted image process parameters 206 are acquired or calculated with high accuracy by the host terminal 20 itself, the imaging apparatus 12 may acquire part of the image process parameters 206 by a simple and easy technique. However, in an environment in which processing resources of the imaging apparatus 12 can be prepared abundantly, the imaging apparatus 12 may acquire the image process parameters 206 particularly.

Further, where the demosaicing section 104 of the imaging apparatus 12 interpolates a pixel value using a filter as in a case in which weighted coefficients of surrounding pixels are used for multiplication and then an average value is calculated, used filter coefficients may be included in the image process parameters 206. Where the filter to be used is changed over in response to the continuity of images in a picked up image, namely, in response to the direction of an outline, information relating to the degree of correlation (correlation information) among the pixels used for the determination may be included in the image process parameters 206. Since various other cases are available for changeover of the filter, a filter to be used or a decision result for changeover may be included suitably in the image process parameters 206 in response to an algorithm to be adopted.

Image data of a transmission target for which correction is performed from within the colored image groups 204a and 204b and the image process parameters 206 relating to the correction are transmitted to the host terminal 20. At this time, also data of a partial image 208 required by the host terminal 20 from within the RAW image 202a acquired by one of the cameras are extracted and transmitted (S14). The host terminal 20 performs a demosaicing process for the partial image 208 of the RAW image transmitted thereto or an image of a partial region of the partial image 208 to generate colored images 212 and performs a correction process for the colored images 212 (S16).

At this time, the image process parameters 206 transmitted as additional data from the imaging apparatus 12 are utilized to reduce the load of processing on the host terminal 20 and make it possible to obtain, with regard to a parameter whose accuracy is less likely to be obtained from some image like a colored image 212, a good correction result of high accuracy obtained from the entire image.

For example, where a luminance histogram is compared with a histogram of a reference image and HSV (Hue, Saturation and Value) adjustment is performed or the gamma value is adjusted so as to minimize the distance between the histograms, sufficient accuracy is less likely to be obtained only from the partial colored images 212. Accordingly, a histogram of the entire image acquired from the imaging apparatus 12 is compared with the histogram of the entire reference image to acquire an adjustment amount, and the adjustment amount is applied to the colored images 212. By this, a good adjustment result of the partial region of the entire image can be obtained. It is to be noted that, where an optimum HSV adjustment amount or an optimum gamma value is derived by the imaging apparatus 12, they may be used as they are for adjustment.

Similarly, also with regard to the gain value of the white balance or the color correction matrix coefficient, where a histogram of the overall region is transmitted from the imaging apparatus 12, this is compared with the histogram of the reference image to derive the parameters by a well-known algorithm, and the parameters are used for the white balance adjustment and the color tone correction of the colored images 212. Where the imaging apparatus 12 derives the parameters and transmits the parameters to the host terminal 20, they are used as they are. As regards the approximate curve and the gain coefficient to be used for shading correction, those acquired as shading correction parameters from the imaging apparatus 12 can be applied to the partial colored images 212 by a simple calculation expression.

Generally, in a demosaicing process, when pixel columns across an edge are averaged to interpolate for pixel values, a color variation between the two regions with the edge as a boundary is smoothed and a color shift or bleeding is likely to occur. Therefore, with regard to pixels in the proximity of an edge, it is devised to exclude information of pixels beyond an edge from an interpolation formula to the utmost. For example, such decisions as whether there is a deviation (magnitude) in correlation of pixel values of surrounding pixels in the horizontal direction/vertical direction and whether the correlation is similar in all directions are performed for each pixel to be interpolated using a predetermined determination formula. Then, a pixel to be included in the interpolation formula is determined through the assumption that images exist continuously in a direction in which the correlation is high. This is performed generally.

Further, various techniques of taking a pixel value of a different color into consideration or weighted averaging pixels over a wider range have been proposed. On the other hand, it is conceivable that, where only the partial colored images 212 are used, an error is likely to occur in the decision by noise or the like and hence desired picture quality cannot be obtained by such color shift, bleeding or the like. Therefore, the decision described above is performed separately using a colored image of an overall region transmitted from the imaging apparatus 12 and having noise removed therefrom, and the interpolation formula is changed over in accordance with a result of the decision. Alternatively, a location at which an edge exists is specified on the basis of an edge image or an image, in which an outline is emphasized, generated from a colored image in the overall region, and the location may be applied to the partial image 208 to change over the interpolation formula. In FIG. 5, information which makes a basis of such changeover is collectively referred to as "correlation information" and included in the image process parameters 206.

The host terminal 20 further generates a depthwise image 210 using stereo images of the same resolution transmitted from the imaging apparatus 12 (S18) or performs a target detection process such as face detection for the transmitted colored image to specify a region to be extracted as a processing target or specify an article included in the picked up image (P12 and P14). Information of a region to be extracted is used for region designation of RAW images whose transmission is to be requested to the imaging apparatus 12 (P16) and besides can be used also to further restrict a region to which a demosaicing process is to be performed by the host terminal 20 from within the partial image 208 of the RAW image transmitted.

Further, information relating to a type of a subject such as the face of a person or a landscape can be used in a correction process in the inside of the host terminal 20 (P18 and P20). For example, the host terminal 20 acquires, on the basis of information that an image included in the partial image 208 is the face of a person, a histogram only of the region of the image and compares the histogram with a histogram of a reference image of the face of a person to separately calculate image process parameters for use in color tone correction and perform correction using the image process parameters. Although various technologies for appropriately correcting an image on the basis of such a distinction as a distinction between a landscape image and a portrait, between an indoor image and an outdoor image, between a daytime image and a night image, or between marine blue or sky blue have been proposed, it is conceivable that it is difficult to decide a reference for such distinction only from the partial image 208.

By performing a demosaicing process and a correction process of the partial image 208 on the basis of information obtained by a known image analysis from a colored image of the overall region acquired from the imaging apparatus 12, an appropriate colored image in accordance with a type of a subject, an image pickup environment and so forth can be obtained even from a partial region. It is to be noted that a size of a colored image to be requested to the imaging apparatus 12 may be designated depending upon the distance of the target from the camera specified on the basis of a depthwise image as described hereinabove.

The host terminal 20 causes the display apparatus 16 to display colored images 212 of high quality generated from a RAW image in this manner by the host terminal 20 itself. At this time, for example, if the colored images 212 are synthesized, for example, with an image transmitted from the imaging apparatus 12 and obtained by enlarging the reduced colored image to its original size, then an image 214 whose field of view is same as that of the picked up image and in which only a region to be noticed such as the face of a person has high quality can be displayed (S18 and S20). Alternatively, only the colored images 212 of high quality may be displayed, or various information processes may be performed or some colored image may be processed and displayed on the basis of a result when image analysis for which an image of high picture quality is requested such as a face recognition process is performed using the colored images 212 of high quality.

With the embodiment described above, data of an image for which a demosaicing process is performed by an imaging apparatus and of a RAW image are transmitted to a host terminal. At this time, a condition used in the demosaicing process itself or a correction process of the same and a parameter necessary for processing are transmitted as additional data together. Then, when the host terminal performs a demosaicing process or correction of the RAW image transmitted thereto, it utilizes the additional data as they are or derives a necessary parameter on the basis of the additional data. Consequently, while the man-hour of processes necessary for a demosaicing process and a correction process by the host terminal is suppressed to the minimum, processing of high quality using a RAW image which is an image free from information loss can be performed freely in response to an application to be executed.

Further, since a parameter such as a histogram obtained from the overall region of a picked up image can be utilized by the host terminal, even if a RAW image to be transmitted from the imaging apparatus to the host terminal is of a partial region, a demosaicing process and a correction process can be performed appropriately for the RAW image as an image of part of the overall region. As a result, a good image satisfying the request can be displayed while the transmission band of data is suppressed. By picking up a stereo image by the imaging apparatus, reducing the stereo image at a plurality of stages, further utilizing information from them or selectively issuing a request for an appropriate image from the host terminal, it is possible to specify an image of a target from the partial region of the RAW image or appropriately select the partial region itself, and the efficiency and the accuracy of processing can be improved further.

By performing demosaicing processes in parallel by the imaging apparatus and the host terminal in this manner, processing is dispersed, and as a result, processes of high accuracy and high quality can be performed with low latency. Further, where the imaging apparatus and the host terminal share part of intermediate data or parameters necessary for processing, even if colored images of both of them are synthesized, apparent continuity is liable to be maintained. Further, since parameters necessary for processing are obtained first, a demosaicing process of a RAW image and a correction process of the same can be performed in parallel for each pixel row by the host terminal, the intermediate buffer for developing an image can be minimized. If such parallel processes are executed by GPUs having a high degree of parallelism, then since the processing efficiency is further improved, the affinity with existing hardware is high.

The present invention has been described above in connection with the embodiment. The embodiment described above is illustrative, and it is recognized by those skilled in the art that various modifications are possible to the combinations of the components and the processes described above and that also such modifications fall within the scope of the present invention.

REFERENCE SIGNS LIST

10 Image processing system, 12 Imaging apparatus, 13a Camera, 16 Display apparatus, 20 Host terminal, 22 Communication section, 24 Distribution section, 28 Demosaicing section, 30 Correction section, 32 Process condition determination section, 34 Decoding section, 40 Output image generation section, 50 Image processing section, 52 Processing controlling section, 54 Display controlling section, 102 Image acquisition section, 104 Demosaicing section, 108 Communication section, 150 Image transmission section, 154 Transmission data extraction section, 156 Correction section, 158 Coding section, 160 Packetization section, 162 Packet buffer, 164 Control section, 170 Pyramid filter section.

INDUSTRIAL APPLICABILITY

As described above, the present invention can be utilized in a computer, a game apparatus, an image processing apparatus, an imaging apparatus, a system including them and so forth.

The invention claimed is:

1. An image processing system comprising:
an imaging apparatus; and
an image processing apparatus having a processor which uses an image picked up by the imaging apparatus to generate a display image and causes a display apparatus to display the display image, wherein
the imaging apparatus includes:
a first demosaicing section configured to acquire, using the processor, data of a non-processed image outputted from an imaging device and perform a demosaicing process and a correction process for the data of the non-processed image to generate a colored image;
a transmission section configured to transmit data of at least part of each of the non-processed image, the colored image and process information acquired by the first demosaicing section in the course of generation of the colored image to the image processing apparatus;
a reception section configured to receive the data transmitted from the imaging apparatus;
a second demosaicing section configured to perform a demosaicing process and a correction process for the data of the transmitted non-processed image to generate a colored image; and
a display image generation section configured to generate a display image using the colored image generated by the second demosaicing section and the colored image transmitted from the imaging apparatus,
wherein the second demosaicing section utilizes the process information transmitted from the imaging apparatus in the course of at least one of the demosaicing process and the correction process, wherein the transmission section of the imaging apparatus transmits a color histogram of the colored image generated by the first demosaicing section as the process information to the image processing apparatus, and wherein the second demosaicing section of the image processing apparatus compares the transmitted color histogram with a color histogram of a reference image to derive a parameter necessary for the correction process.

2. The image processing system according to claim 1, wherein the transmission section of the imaging apparatus transmits at least one of a gain value to be used for multiplication of a pixel value, a filter coefficient and an adjustment amount of a given parameter acquired for correction of an image as the process information to the image processing apparatus.

3. An imaging apparatus which supplies data of a picked up image to an image processing apparatus which generates a display image using a picked up image and causes a display apparatus to display the display image, the imaging apparatus comprising:

a demosaicing section configured to acquire, using a processor, data of a non-processed image outputted from an imaging device and perform a demosaicing process and a correction process for the data of the non-processed image to generate a colored image; and a transmission section configured to transmit, to the image processing apparatus, data of at least part of the data of the non-processed image which is determined as a target for which a demosaicing process and a correction process are to be performed in the image processing apparatus, at least part of data of the colored image to be used for generation of the display image and at least part of process information acquired by the demosaicing section in the course of generation of the colored image and utilized in the course of at least one of the demosaicing process and the correction process in the image processing apparatus, wherein the transmission section transmits, to the image processing apparatus, at least one of a gain value to be used for multiplication of a pixel value, a filter coefficient, an adjustment amount of a given parameter and a color histogram of the colored image generated by the demosaicing section, acquired in the course of the correction process by the demosaicing section as the process information.

* * * * *